(12) United States Patent
Gallego

(10) Patent No.: US 6,955,833 B1
(45) Date of Patent: Oct. 18, 2005

(54) COATING GLASS

(75) Inventor: Jose Manuel Gallego, Ormskirk (GB)

(73) Assignee: Pilkington Plc, St. Helens (GB)

( * ) Notice: Subject to any disclaimer, the term of this patent is extended or adjusted under 35 U.S.C. 154(b) by 0 days.

(21) Appl. No.: 09/856,584

(22) PCT Filed: Nov. 30, 1999

(86) PCT No.: PCT/GB99/03984

§ 371 (c)(1),
(2), (4) Date: May 23, 2001

(87) PCT Pub. No.: WO00/32530

PCT Pub. Date: Jun. 8, 2000

(30) Foreign Application Priority Data

Dec. 1, 1998 (GB) .................................. 9826293

(51) Int. Cl.[7] .............................................. B05D 5/06
(52) U.S. Cl. ................ 427/167; 427/250; 427/255.18; 427/255.19; 428/698; 428/702; 428/433
(58) Field of Search ............................ 427/163.1, 166, 427/167, 255.13, 255.15, 255.18, 255.19, 427/250, 251, 255.5; 204/192.12, 192.26, 204/192.27, 192.28; 428/212, 215, 332, 446, 428/698, 699, 701, 702, 433

(56) References Cited

U.S. PATENT DOCUMENTS

| | | |
|---|---|---|
| 4,462,883 A | 7/1984 | Hart |
| 4,749,397 A | 6/1988 | Chesworth et al. |
| 4,828,880 A | 5/1989 | Jenkins et al. |
| 5,279,722 A | 1/1994 | Szczyrbowski et al. |
| 5,304,394 A | 4/1994 | Sauvinet et al. |
| 5,505,989 A | 4/1996 | Jenkinson |
| 5,580,364 A | 12/1996 | Goodman et al. |
| 5,745,291 A | 4/1998 | Jenkinson |
| 5,935,702 A * | 8/1999 | Macquart et al. ........... 428/336 |
| 5,965,246 A * | 10/1999 | Guiselin et al. ............ 428/212 |

FOREIGN PATENT DOCUMENTS

| | | |
|---|---|---|
| EP | 0 275 662 B1 | 7/1988 |
| EP | 0 543 077 B1 | 5/1993 |
| EP | 0 583 871 B1 | 2/1994 |
| GB | 2 031 756 A | 4/1980 |
| GB | 2 129 831 A | 5/1984 |
| GB | 2 186 001 A | 8/1987 |
| GB | 2 199 848 A | 12/1996 |
| JP | 63 100043 A | 5/1988 |
| JP | 03 126644 A | 5/1991 |

OTHER PUBLICATIONS

Database WPI, Section Ch, Week 198823, Derwent Publications Ltd., London, GB; AN 1988-15891 XP002131524.
Chemical Abstracts, vol. 115, No. 26, Dec. 30, 1991, Columbus, Ohio, US; abstract No. 285686f, p. 364, XP000373670.

* cited by examiner

Primary Examiner—Timothy Meeks
Assistant Examiner—David Turocy
(74) Attorney, Agent, or Firm—Marshall & Melhorn, LL

(57) ABSTRACT

A process for the production of a heat-treatable low emissivity coated glass that comprises the steps of depositing an underlayer onto a glass substrate and subsequently depositing a reflective metal layer by a vacuum deposition process, wherein the underlayer is deposited by a pyrolytic deposition process. Preferably an anti-reflection layer is deposited by a vacuum deposition process on to the coated glass after deposition of the reflective metal layer. The underlayer may comprise a silicon oxide, the reflective metal layer may comprise silver and the anti-reflection layer may comprise a metal oxide, especially tin oxide or zinc oxide. The coated glass preferably has an emissivity of below 0.2 after heat treatment in an oxidising atmosphere.

30 Claims, 1 Drawing Sheet

COATING GLASS

BACKGROUND OF THE INVENTION

This invention relates to a process for the production of a heat-treatable low emissivity coated glass and to a heat-treatable low emissivity coated glass.

It is known that transparent glass substrates with a thin reflective metal coating, typically silver 5 nm to 30 nm thick, may be produced with low emissivity and a high visible light transmission i.e. which reflect a high proportion of infra-red radiation incident upon them but allow visible radiation to pass through. The use of such coatings on window glass leads to a reduction in heat loss. For optimum light transmission, the silver layers are sandwiched between thin anti-reflection layers of metal oxide. Such low emissivity coatings are produced by vacuum deposition processes, especially sputtering, and normally comprise a thin layer of silver sandwiched between two layers of metal oxide. Such coatings are described, for example, in UK patent specification GB 2 129 831.

Unfortunately, such low emissivity coatings are not stable to heating in air, and the coating loses its properties of low emissivity and high light transmission when the coated glass is subjected to a thermal cycle which cycle is required for bending or toughening the glass. To obtain a toughened or bent glass substrate bearing a low emissivity reflective metal coating that has high light transmission it has been necessary to either bend and/or toughen the glass before depositing the reflective metal coating or to deposit an additional, protective layer over the reflective metal layer before bending/toughening. GB patent 2 186 001B describes this problem and a process for the production of a bent and/or toughened silver coated glass substrate wherein an additional metal layer of aluminium, titanium, zinc or tantalum is deposited over the silver layer. The additional metal layer protects the silver layer beneath it from degradation during the bending or toughening thermal cycle by acting as a barrier layer between the silver layer and the oxidising atmosphere.

BRIEF SUMMARY OF THE INVENTION

The applicants have now discovered that the above problem may be alleviated by depositing an underlayer onto glass substrate using a pyrolytic deposition process and subsequently depositing a reflective metal layer onto the coated substrate.

According to one aspect of the present invention there is provided a process for the production of a heat-treatable low emissivity coated glass that comprises the steps of
 a) depositing an underlayer onto a glass substrate, and
 b) subsequently depositing a reflective metal layer by a vacuum deposition method, characterised in that the underlayer is deposited by a pyrolytic deposition process.

Surprisingly, the underlayer deposited by a pyrolytic deposition process provides protection to the reflective metal layer on heat-treatment despite its position underneath the reflective metal layer. In preferred embodiments of the invention a barrier layer is unnecessary which is advantageous because then fewer layers need be deposited reducing the time needed for the process and so increasing production rates.

Normal emissivity is defined in International Standard ISO 12092:1994 (F), Annex A as $\epsilon_N = 1 - R_N$ where $R_N$ is the normal reflectance over the wavelength range 5.5 $\mu$m to 50 $\mu$m at 283 K. Low emissivity coatings as discussed herein are those which have a normal emissivity of below about 0.4. The lower the emissivity of the coated glass the better are the heat rejecting properties of the glass.

Usually, the reflective metal layer is deposited directly on the underlayer, but one or more intermediate layers (e.g. of metal oxide) may be deposited between the underlayer and the reflective metal layer if, for example it is desired to deposit an anti-reflection layer or anti-reflection layers additional to the underlayer. Layers may also be deposited beneath the underlayer.

Pyrolytic deposition processes are processes which are usually carried out at substantially atmospheric pressure wherein a fluid is directed onto a hot substrate under conditions such that a coating is formed on the substrate. Processes wherein the fluid is a liquid are termed spray deposition processes and processes wherein the fluid is a vapour are termed chemical vapour deposition (CVD) processes. The preferred pyrolytic deposition process for deposition of the underlayer is CVD because it may be performed on line (i.e. during the float glass production process) and produces good quality coating layers.

It is thought that any pyrolytically deposited material could be advantageously used as an underlayer in the present invention. For example, the underlayer may comprise silicon oxide, silicon oxide containing carbon (often referred to as silicon oxycarbide and which may be deposited as described in European patent application 275 662 A), silicon oxide containing nitrogen (often referred to as silicon oxynitride and which may be deposited as described in GB patent 2 031 756 B), titanium oxide, tin oxide, titanium nitride, silicon nitride, silicon carbide, silicon or a mixture comprising one or more of these materials. The preferred underlayer comprises a silicon oxide, especially a silicon oxide containing carbon, because silicon oxide layers are relatively easily deposited by CVD in a range of stoichiometries (and hence a range of refractive indices).

If silicon oxide is selected as the underlayer material, pyrolytically depositing the underlayer preferably comprises contacting the glass substrate with a fluid mixture containing a silicon source, an oxygen source and a carbon source under conditions such that a silicon oxide layer, preferably containing carbon, is deposited. Preferably, the fluid mixture is a vapour mixture.

The underlayer will usually be deposited on the glass substrate when the glass substrate is at a temperature in the range 450° C. to 800° C., especially when the glass substrate is at a temperature in the range 600° C. to 780° C.

Preferably, the underlayer is deposited on to a glass ribbon during the float glass production process at substantially atmospheric pressure in which case the glass ribbon will usually be cut into sheets after deposition of the underlayer (and before deposition of other layers including the reflective metal and any subsequent layers) for storage or convenient transport from the float glass production facility to the vacuum deposition facility.

The reflective metal layer may comprise silver or aluminium, preferably silver.

A vacuum deposition process is one which is usually performed at a pressure of lower than about 0.1 mbar and includes such methods as sputtering, reactive sputtering, evaporation and other forms of physical vapour deposition. The preferred vacuum deposition method for depositing a reflective metal layer is sputtering.

Usually, an anti-reflection layer is deposited by a vacuum deposition process on to the coated glass after deposition of the reflective metal layer. Preferably, the anti-reflection layer comprises a metal oxide, more preferably the anti-reflection layer comprises zinc oxide or tin oxide. More than one anti-reflection layer may be deposited.

If an anti-reflection layer is deposited by reactive sputtering in an oxidising atmosphere comprising, for example, more than 70% by volume oxygen, a further protective layer is preferably deposited on the reflective metal layer before the sputtering-step so as to protect the reflective metal layer from degradation by the oxidising atmosphere. The further protective layer preferably comprises inconel or nichrome. Other layers may also be deposited between the reflective metal layer and anti-reflection layer(s).

The invention also provides a process for the production of coated glass having a coating with more than one reflective metal layer. Thus, in an embodiment of the invention a second reflective metal layer and a second anti-reflection layer are sequentially deposited by a vacuum deposition process after deposition of the first anti-reflection layer. In this embodiment of the invention (where the coated glass has two reflective metal layers) the glass will usually have lower emissivity than in the single reflective metal layer embodiment and also, with appropriate layer thicknesses, a reduced transmission of solar heat.

The process may additionally comprise a heat treatment step wherein the heat-treatable low emissivity coated glass is subjected to a temperature in the range 400° C. to 750° C. in an oxidising atmosphere, which is usually directed to the production of bent and/or toughened coated glass. Surprisingly and advantageously, the visible transmission of the heat-treatable low emissivity coated glass may be increased by the heat-treatment step.

In a further aspect, the invention provides a heat-treatable low emissivity coated glass comprising a glass substrate having a multilayer coating on a surface, said multilayer coating comprising a pyrolytically deposited underlayer, a vacuum deposited reflective metal layer and a vacuum deposited anti-reflection layer.

Preferably the underlayer-comprises a silicon oxide, more preferable a silicon oxide containing carbon and advantageously, the underlayer will have a refractive index in the range 1.5 to 3 because an underlayer with a refractive index in this range enables a coating with a low visible light reflection to be produced (i.e. this range of refractive index is suitable for an anti-reflection underlayer). In most embodiments of the invention the underlayer has a thickness in the range 30 to 100 nm.

The reflective metal layer usually comprises silver or aluminium and preferably has a thickness in the range 5 to 30 nm, more preferably in the range 7 to 18 nm. At thicknesses lower than 7 nm the reflective metal layer may be discontinuous (this results from the growth mechanism of a layer and may occur even on a flat substrate) and will then not possess the properties of the bulk metal (resulting in poor infra red reflecting properties), whereas thicknesses higher than 18 nm may cause the coated glass to have too high a reflectivity to visible light.

The anti-reflection layer beneficially has a thickness in the range 30 nm to 90 nm.

Coated glass according to the invention will usually have a normal emissivity of below 0.2, preferably below 0.1. Coated glass according to the invention which has been heat treated by heating it to a temperature in the range 400 to 700° C. in an oxidising atmosphere will usually have a normal emissivity of below 0.2, preferably below 0.1, after the heat treatment step. Surprisingly and advantageously, heat treatment tends to reduce the emissivity of those embodiments of the invention having a single reflective metal layer.

It is thought that a pyrolytically deposited underlayer reduces oxygen induced degradation during heat treatment in an oxidising atmosphere by scavenging oxygen that would otherwise attack the silver layer. Underlayers that scavenge oxygen deposited using methods other than pyrolysis may also be useful as underlayers in the invention.

Thus, in a further aspect of the present invention a heat-treatable low emissivity coated glass comprises a glass substrate having a multilayer coating on one surface, said multilayer coating comprising an oxygen scavenging underlayer, a vacuum deposited reflective metal layer and a vacuum deposited anti-reflection layer.

The oxygen scavenging underlayer may comprise a material deficient in oxygen that has the potential to bind oxygen in preference to the reflective metal layer (usually a silver layer). An example of a material likely to be suitable as an oxygen scavenging underlayer is oxygen deficient silicon oxide ($SiO_x$ where x is less than 2).

Coated glasses produced by the process of the present invention have uses in many areas of glass use including as a glazing pane in a multiple glazing unit or as a glazing pane in a laminated glass which will also comprise a polymer interlayer (usually of polyvinylbutyral) and a second glazing pane.

BRIEF DESCRIPTION OF THE DRAWINGS

So that the invention may be better understood reference will now be made to the following drawings in which:—

DETAILED DESCRIPTION OF THE INVENTION

Figure 1:
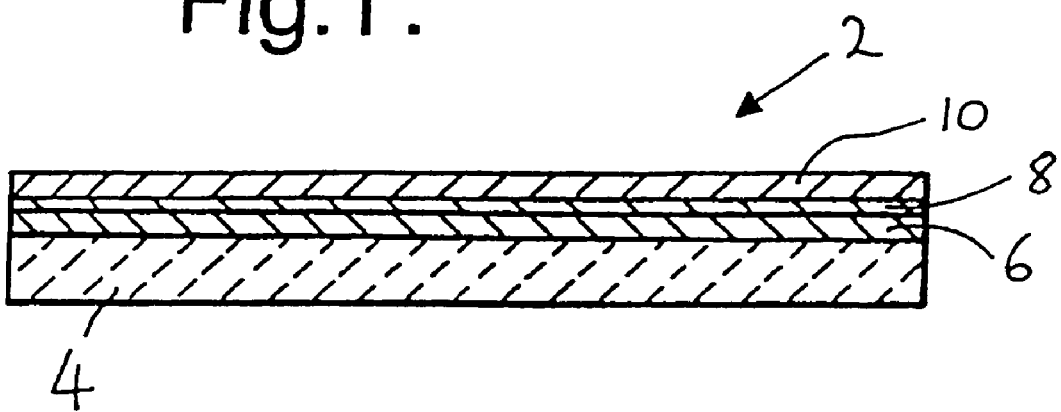
FIG. 1 illustrates schematically a section through a coated glass having a single reflective metal layer, the coated glass produced by a process according to the invention.

Referring to FIG. 1, a low emissivity coated glass 2 with a single silver layer 8 comprises a glass substrate 4, a pyrolytically deposited underlayer 6 of silicon oxide containing carbon of thickness 58 nm, a DC magnetron vacuum sputtered silver layer 8 of thickness 12 nm and a further layer of sputtered zinc oxide 10 of thickness 38 nm. The underlayer 6 is deposited by on line chemical vapour deposition. The underlayer 6 and the zinc oxide layer 10 act as anti-reflection layers.

Figure 2:
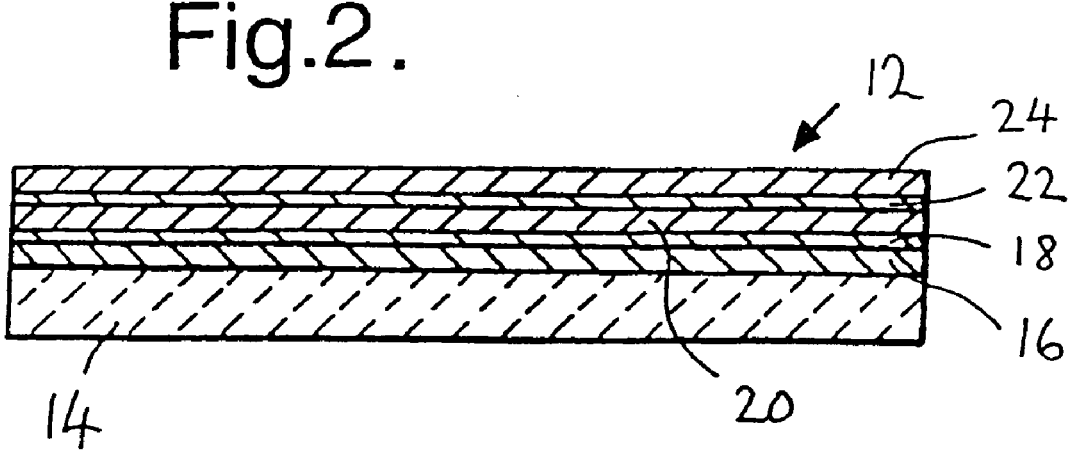
FIG. 2 illustrates schematically a section through a coated glass having two reflective metal layers, the coated glass produced by a process according to the invention.

Referring to FIG. 2, a low emissivity coated glass 12 with two silver layers 18 and 22 comprises a glass substrate 14, a pyrolytically deposited underlayer 16 of silicon oxide containing carbon of thickness 58 nm, and DC magnetron vacuum sputtered layers of: silver 18 of thickness 8.1 nm, zinc oxide 20 of thickness 85 nm, silver 22 of thickness 8.4 nm, and zinc oxide 24 of thickness 49 nm. A two silver layer low emissivity coating can provide greater infra red reflection compared to a single silver layer low emissivity coating and can also provide good solar control properties (i.e. reducing transmitted solar heat).

The invention is further illustrated by the following Examples, in which vacuum deposited coatings were applied to glass substrates coated with an underlayer of silicon oxide containing carbon.

The silicon oxycarbide (silicon oxide containing carbon) underlayer was deposited substantially as described in European patent application EP 0 275 662A by applying a flowing gaseous mixture to the upper surface of a glass ribbon during the float glass production process using a water-cooled graphite coater. The gaseous mixture was applied at a position where the glass temperature was approximately 773° C. as the ribbon advanced at a ribbon speed of 127 m/hr over the float bath. The gaseous mixture comprised nitrogen (as carrier gas, flow rate 0.92 kg/hr), monosilane ($SiH_4$, flow rate 0.06 kg/hr), ethylene (flow rate 1.84 kg/hr) and carbon dioxide (flow rate 2.31 kg/hr). The gaseous mixture was caused to flow parallel to the glass surface in the direction of movement of the glass under laminar flow conditions using an apparatus as described in GB patent specification 1 507 966 extending over the 2 m width of the glass ribbon, and with a path of travel extending approximately 0.1 m down-ribbon. The thickness of the glass was about 2.8 mm.

At the end of the float line, samples of the glass coated with the underlayer were cut from the glass ribbon. Coating layers were vacuum deposited on the samples at room temperature by sputtering or reactive sputtering using an Airco Temescal ILS 1600 sputtering plant and DC magnetron sputtering using metal targets of 99.9% purity or better. Deposition conditions for layers comprising silver, inconel, tin (IV) oxide and zinc oxide are described in Table 1.

The layer materials and layer thicknesses for the underlayer and the vacuum deposited coatings in the Examples are described in Table 2.

Table 3 describes the optical properties of the coated glasses of the Examples before and after (the values after heat treatment are in brackets) heat treatment to simulate toughening. The heat treatment consisted of subjecting the coated glass to a temperature of 640° C. in air for 1.5 minutes. The visible transmission, reflection and the transmission and reflection colours in Table 3 were measured using an Hitachi U400 spectrophotometer and/or a Perkin Elmer 883 spectrophotometer, and calculated using the methods described in International Standard ISO 12092: 1994 (F) and other standard methods. The thicknesses of the layers were determined by computer fitting the spectra and by profilometry (Sloan Dektak II profilometer) after appropriate etching treatment (e.g. with aqueous hydrofluoric acid).

TABLE 1

| | Layer Material | | | |
|---|---|---|---|---|
| | Silver | Inconel | Tin Oxide | Zinc Oxide |
| Power Density (W/cm$^2$) | 0.61 | 0.36 | 3.6 | 3.8 |
| Gas Pressure (10$^{-3}$ mbar) | 9.3 | 11.8 | 6.7 | 6.8 |
| Gas Composition (%) | | | | |
| Ar | 100 | 100 | 0 | 30 |
| $O_2$ | 0 | 0 | 100 | 70 |
| Target - Substrate Distance (cm) | 11 | 11 | 11 | 11 |
| Substrate speed (cm/s) | 2.7 | 2.9 | 3.1 | 3.1 |
| Number of passes to obtain: | 8 | 8 | 10 | 10 |
| Thickness (Å) | 102 | 10 | 362 | 340 |

TABLE 2

| Layers | Example 1 | Example 2 | Example 3 | Example 4 |
|---|---|---|---|---|
| Silicon Oxide underlayer (nm) | 58 | 58 | 58 | 58 |
| First Silver Layer (nm) | 11.9 | 8.1 | 11.4 | 7.9 |
| First Inconel Layer (nm) | — | — | 0.65 | 0.56 |
| First Dielectric Layer (nm) | 38 (ZnO) | 85 (ZnO) | 42 ($SnO_2$) | 83 ($SnO_2$) |
| Second Silver Layer (nm) | — | 8.4 | — | 8.8 |
| Second Inconel Layer (nm) | — | — | — | 0.54 |
| Second Dielectric Layer (nm) | — | 49 (ZnO) | — | 48 ($SnO_2$) |

TABLE 3

| | Example 1 Value before (after) heat treatment | Example 2 Value before (after) heat treatment | Example 3 Value before (after) heat treatment | Example 4 Value before heat treatment |
|---|---|---|---|---|
| Visible Transmission % | 76.3 (78.2) | 74.1 (74.9) | 74.5 (78.1) | 73.2 |
| Visible Reflection % | 9.5 (9.1) | 5.4 (5.2) | 10.7 (9.2) | 6.4 |
| Transmission Colour | | | | |
| a* | −4.2 (−3.9) | −3.9 (−4.2) | −5.1 (−3.4) | −4.6 |
| b* | 5.3 (4.9) | 5.1 (5.4) | 7.2 (7.4) | 6.7 |
| L | 91 (92) | 88 (88) | 89 (91) | 86.2 |
| Reflection Colour | | | | |
| a* | 8.2 (7.9) | 3.1 (3.5) | 10.4 (8.9) | 3.4 |
| b* | −3.2 (−3.8) | 2.5 (3.2) | −5.3 (−4.8) | 5.5 |

TABLE 3-continued

| | Example 1 Value before (after) heat treatment | Example 2 Value before (after) heat treatment | Example 3 Value before (after) heat treatment | Example 4 Value before heat treatment |
|---|---|---|---|---|
| L | 35.2 (33.5) | 31.2 (29.5) | 38.7 (34.5) | 30.2 |
| Normal Emissivity | 0.072 (0.069) | 0.060 (0.065) | 0.076 (0.072) | 0.066 |

What is claimed is:

1. A process for the production of a heat-treatable low emissivity coated glass that comprises the steps of:
   a) depositing an underlayer onto a glass substrate by a pyrolytic deposition process, and
   b) subsequently depositing a reflective metal layer by a vacuum deposition method, directly on the underlayer, wherein the under layer comprises a silicon oxide containing carbon or nitrogen.

2. A process according to claim 1 wherein the pyrolytic deposition of the underlayer comprises contacting the glass substrate with a fluid mixture containing a silicon source, an oxygen source and a carbon source under conditions such that a silicon oxide layer, containing carbon, is deposited.

3. A process according to claim 2 wherein the fluid mixture is a vapor mixture.

4. A process according to claim 1 wherein the underlayer is deposited on the glass substrate when the glass substrate is at a temperature in the range 450° C. to 800° C.

5. A process according to claim 4 wherein the underlayer is deposited on the glass substrate when the glass substrate is at a temperature in the range 600° C. to 780° C.

6. A process according to claim 1 wherein the underlayer is deposited on to a glass ribbon during the float glass production process at substantially atmospheric pressure.

7. A process according to claim 6 wherein the glass ribbon is cut into sheets after deposition of the underlayer.

8. A process according to claim 1 wherein the reflective metal layer comprises silver or aluminum.

9. A process according to claim 1 wherein an anti-reflection layer is deposited by a vacuum deposition process on to the coated glass after deposition of the reflective metal layer.

10. A process according to claim 9 wherein the anti-reflection layer comprises a metal oxide.

11. A process according to claim 10 wherein the anti-reflection layer comprises zinc oxide or tin oxide.

12. A process according to claim 9 wherein a second reflective metal layer and a second anti-reflection layer are sequentially deposited by a vacuum deposition process after deposition of the first anti-reflection layer.

13. A process according to claim 1 additionally comprising a heat treatment step wherein the heat-treatable low emissivity coated glass is subjected to a temperature in the range 400 to 750° C. in an oxidizing atmosphere.

14. A process according to claim 13 wherein the heat treatment step is directed to the production of bent and/or toughened coated glass.

15. A process according to claim 13 wherein the visible transmission of the coated glass is increased by the heat-treatment step.

16. A coated glass produced by a process according to claim 1.

17. A heat-treatable low emissivity coated glass comprising a glass substrate having a multilayer coating on one surface, said multilayer coating comprising a pyrolytically deposited underlayer which comprises a silicon oxide containing nitrogen or carbon and is deposited directly on the glass, a vacuum deposited reflective metal layer that is deposited directly on the underlayer, and a vacuum deposited anti-reflection layer.

18. A coated glass according to claim 17 wherein the underlayer has a refractive index in the range 1.5 to 3.

19. A coated glass according to claim 17 wherein the underlayer has a thickness in the range 30 to 100 nm.

20. A coated glass according to claim 17 wherein the reflective metal layer has a thickness in the range 5 to 30 nm.

21. A coated glass according to claim 20 wherein the reflective metal layer has a thickness in the range 7 to 18 nm.

22. A coated glass according to claim 17 wherein the anti-reflection layer has a thickness in the range 30 nm to 90 nm.

23. A coated glass according to claim 17 wherein the coated glass has a normal emissivity of below 0.2.

24. A coated glass according to claim 17 wherein the coated glass has a normal emissivity of below 0.1.

25. A coated glass according to claim 17 wherein the coated glass has been heat treated by heating it to a temperature in the range 400 to 700° C. in an oxidizing atmosphere.

26. A coated glass according to claim 25 wherein the coated glass has a normal emissivity of below 0.2 after the heat treatment step.

27. A coated glass according to claim 26 wherein the coated glass has a normal emissivity of below 0.1 after the heat treatment step.

28. A heat-treatable low emissivity coated glass comprising a glass substrate having a multilayer coating on one surface, said muitilayer coating comprising an oxygen scavenging underlayer comprising a silicon oxide containing nitrogen or carbon, a vacuum deposited reflective metal layer that is deposited directly on the underlayer and a vacuum deposited anti-reflection layer.

29. A multiple glazing unit comprising a first glazing pane of a coated glass according to claim 28 and a second glazing pane.

30. Laminated glass comprising a first glazing pane of a coated glass according to claim 28, an interlayer and a second glazing pane.

* * * * *